US012391857B2

United States Patent
Rufus et al.

(10) Patent No.: US 12,391,857 B2
(45) Date of Patent: Aug. 19, 2025

(54) ADHESIVES FOR LOW SURFACE ENERGY MATERIALS

(71) Applicant: BMIC LLC, Dallas, TX (US)

(72) Inventors: Isaac Bernard Rufus, Newark, DE (US); Adem Chich, Kearny, NJ (US); Michael Dougherty, Mount Arlington, NJ (US); Richard Chin, Livingston, NJ (US); Overton Williams, Paterson, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/653,669

(22) Filed: May 2, 2024

(65) Prior Publication Data

US 2024/0336819 A1    Oct. 10, 2024

Related U.S. Application Data

(63) Continuation of application No. 18/297,792, filed on Apr. 10, 2023, now Pat. No. 11,981,837.

(60) Provisional application No. 63/329,123, filed on Apr. 8, 2022.

(51) Int. Cl.
| | | |
|---|---|---|
| *B32B 41/00* | (2006.01) | |
| *C09J 195/00* | (2006.01) | |
| *E04D 5/14* | (2006.01) | |
| *C09J 11/06* | (2006.01) | |

(52) U.S. Cl.
CPC ............ *C09J 195/00* (2013.01); *E04D 5/148* (2013.01); *C09J 11/06* (2013.01); *C09J 2203/346* (2020.08); *C09J 2401/006* (2013.01)

(58) Field of Classification Search
CPC .... C09J 195/00; C09J 11/06; C09J 2203/346; C09J 2401/006; C09J 153/00; E04D 5/148; E04D 5/00
USPC ................... 156/60, 64, 350, 351, 378, 379
See application file for complete search history.

(56) References Cited

U.S. PATENT DOCUMENTS

| | | |
|---|---|---|
| 4,755,545 A | 7/1988 | Lalwani |
| 5,380,552 A | 1/1995 | George et al. |
| 9,574,117 B2 | 2/2017 | Ma et al. |
| 2004/0172899 A1 | 9/2004 | Paradise et al. |
| 2006/0286346 A1 | 12/2006 | Mehta et al. |
| 2009/0105376 A1 | 4/2009 | Korenstra et al. |
| 2010/0162657 A1 | 7/2010 | Swei et al. |
| 2014/0373754 A1 | 12/2014 | Luccarelli et al. |

(Continued)

FOREIGN PATENT DOCUMENTS

| | | |
|---|---|---|
| WO | 2015127562 A1 | 9/2015 |
| WO | 2022051619 A1 | 3/2022 |

*Primary Examiner* — Michael N Orlando
*Assistant Examiner* — Joshel Rivera
(74) *Attorney, Agent, or Firm* — GREENBERG TRAURIG, LLP

(57) ABSTRACT

A roofing system includes a roofing membrane. The roofing membrane has a surface energy of 40 mN/m or less. The roofing system includes a roofing substrate. The roofing system includes an adhesive disposed between the roofing membrane and the roofing substrate. The adhesive includes a styrenic block copolymer. The styrenic block copolymer is present in an amount of 0.5 wt. % to 30 wt. % based on a total weight of the adhesive. The adhesive includes asphalt. The asphalt is present in an amount of 70 wt. % to 99.5 wt. % based on the total weight of the adhesive. A ratio of the styrenic block copolymer to the asphalt in the adhesive is 1:11 to 1:3.

20 Claims, 3 Drawing Sheets

(56) References Cited

U.S. PATENT DOCUMENTS

| | | |
|---|---|---|
| 2017/0008233 A1 | 1/2017 | Vontorcik, Jr. et al. |
| 2020/0095478 A1* | 3/2020 | Young et al. |
| 2020/0095768 A1* | 3/2020 | Yu ..................... B32B 13/042 |
| 2020/0224419 A1 | 7/2020 | Boss et al. |
| 2022/0064501 A1 | 3/2022 | Rufus et al. |
| 2022/0356707 A1 | 11/2022 | Yu et al. |
| 2023/0092077 A1 | 3/2023 | Lorenzen et al. |

* cited by examiner

ADHESIVES FOR LOW SURFACE ENERGY MATERIALS

CROSS-REFERENCE TO RELATED APPLICATIONS

This application is a continuation of U.S. patent application Ser. No. 18/297,792, filed on Apr. 10, 2023, now U.S. Pat. No. 11,981,837, and entitled "ADHESIVES FOR LOW SURFACE ENERGY MATERIALS," which claims priority to U.S. Provisional Application No. 63/329,123, filed on Apr. 8, 2022, and entitled "ADHESIVES FOR LOW SURFACE ENERGY MATERIALS," the entire contents of which are hereby incorporated by reference.

FIELD

This disclosure relates generally to adhesive formulations. More particularly, this disclosure relates to adhesive formulations that can be utilized in the roofing arts.

BACKGROUND

Current systems and methods for roofing protection of commercial and residential roofing often employ an adhesive-only system that provides good protection and has a long installed life, but can be difficult to achieve strong, enduring adhesion between the membrane materials and a roof substrate. Adhesive-only systems can be difficult to install, may use a fleecy layer to aid adhesion, and may utilize application of the adhesive to both the membrane and the roof substrate.

SUMMARY

In some embodiments, a roofing system includes a roofing membrane. In some embodiments, the roofing membrane has a surface energy of 40 mN/m or less. In some embodiments, the roofing system includes a roofing substrate; and an adhesive disposed between the roofing membrane and the roofing substrate. In some embodiments, the adhesive includes a styrenic block copolymer. In some embodiments, the styrenic block copolymer is present in an amount of 0.5 wt. % to 30 wt. % based on a total weight of the adhesive. In some embodiments, the adhesive includes asphalt. In some embodiments, the asphalt is present in an amount of 70 wt. % to 99.5 wt. % based on the total weight of the adhesive. In some embodiments, a ratio of the styrenic block copolymer to the asphalt in the adhesive is 1:11 to 1:3.

In some embodiments, the roofing substrate is a second roofing membrane.

In some embodiments, the roofing substrate is a cellulosic based material.

In some embodiments, the adhesive further comprises a filler. In some embodiments, the filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, a roofing system includes a roofing membrane. In some embodiments, the roofing membrane has a surface energy of 40 mN/m or less. In some embodiments, the roofing system includes a roofing substrate; and an adhesive disposed between the roofing membrane and the roofing substrate. In some embodiments, the adhesive includes a styrene-butadiene-styrene (SBS) copolymer. In some embodiments, the SBS copolymer is present in an amount of 0.5 wt. % to 30 wt. % based on a total weight of the adhesive. In some embodiments, the adhesive includes a process oil. In some embodiments, the process oil is present in an amount of 20 wt. % to 70 wt. % based on a total weight of the adhesive. In some embodiments, asphalt is present in an amount of less than 1 wt. % based on the total weight of the adhesive. In some embodiments, a ratio of the SBS copolymer to the process oil in the adhesive is 1:10 to 1:3.

In some embodiments, the process oil is chosen from at least one paraffinic oil, at least one bio-oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), at least one blend of process oil and a plasticizer, or any combination thereof.

In some embodiments, the roofing substrate is a second roofing membrane.

In some embodiments, the roofing substrate is a cellulosic based material.

In some embodiments, the adhesive further comprises a filler. In some embodiments, the filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, the adhesive comprises a recycled asphalt shingle waste.

In some embodiments, a method includes obtaining a styrenic block copolymer; obtaining asphalt; and mixing the styrenic block copolymer with the asphalt to form an adhesive formulation. In some embodiments, the styrenic block copolymer is present in an amount of 0.5 wt. % to 30 wt. % based on a total weight of the adhesive formulation. In some embodiments, the asphalt is present in an amount of 70 wt. % to 99.5 wt. % based on a total weight of the adhesive formulation. In some embodiments, a ratio of the styrenic block copolymer to the asphalt in the adhesive formulation is 1:11 to 1:3.

In some embodiments, the method includes adding a filler. In some embodiments, the filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, the filler is present in an amount of 0.00001% to 70% by weight of the adhesive formulation.

In some embodiments, a method includes obtaining a styrene-butadiene-styrene (SBS) copolymer; obtaining a process oil; and mixing the SBS copolymer with the process oil to form an adhesive formulation. In some embodiments, the SBS copolymer is present in an amount of 0.5 wt. % to 30 wt. % based on a total weight of the adhesive formulation. In some embodiments, the process oil is present in an amount of 20 wt. % to 70 wt. % based on a total weight of the adhesive formulation. In some embodiments, asphalt is present in an amount of less than 1 wt. % based on a total weight of the adhesive formulation. In some embodiments, a ratio of the SBS copolymer to the process oil in the adhesive formulation is 1:10 to 1:3.

In some embodiments, the method includes adding a filler. In some embodiments, the filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, the filler is present in an amount of 0.00001% to 70% by weight of the adhesive formulation.

In some embodiments, a roofing system includes a thermoplastic polyolefin (TPO) membrane. In some embodiments, the roofing system includes a roofing substrate. In some embodiments, the roofing system includes an adhesive disposed between the TPO membrane and the roofing substrate. In some embodiments, the adhesive includes a styrene-butadiene-styrene (SBS) copolymer. In some embodiments, the SBS copolymer is present in an amount of 0.5 wt. % to 30 wt. % based on a total weight of the adhesive. In some embodiments, the adhesive includes asphalt. In some embodiments, the asphalt is present in an amount of 70 wt. % to 99.5 wt. % based on the total weight of the adhesive. In some embodiments, a ratio of the SBS copolymer to the asphalt in the adhesive is 1:11 to 1:3.

In some embodiments, a roofing system includes a thermoplastic polyolefin (TPO) membrane. In some embodiments, the roofing system includes a roofing substrate. In some embodiments, the roofing system includes an adhesive disposed between the TPO membrane and the roofing substrate. In some embodiments, the adhesive includes a styrene-butadiene-styrene (SBS) copolymer. In some embodiments, the SBS copolymer is present in an amount of 0.5 wt. % to 30 wt. % based on a total weight of the adhesive. In some embodiments, the adhesive includes a process oil. In some embodiments, the process oil is present in an amount of 20 wt. % to 70 wt. % based on a total weight of the adhesive. In some embodiments, the asphalt is present in an amount of less than 1 wt. % based on the total weight of the adhesive. In some embodiments, a ratio of the SBS copolymer to the process oil in the adhesive is 1:10 to 1:3.

In some embodiments, a roofing system includes a first substrate. In some embodiments, the roofing system includes a second substrate. In some embodiments, the roofing system includes an adhesive disposed between the first substrate and the second substrate. In some embodiments, the adhesive includes a styrene-butadiene-styrene (SBS) copolymer. In some embodiments, the SBS copolymer is present in an amount of 0.5 wt. % to 30 wt. % based on a total weight of the adhesive. In some embodiments, the adhesive includes asphalt. In some embodiments, the asphalt is present in an amount of 70 wt. % to 99.5 wt. % based on the total weight of the adhesive. In some embodiments, a ratio of the SBS copolymer to the asphalt in the adhesive is 1:11 to 1:3.

In some embodiments, a roofing system includes a first substrate. In some embodiments, the roofing system includes a second substrate. In some embodiments, the roofing system includes an adhesive disposed between the first substrate and the second substrate. In some embodiments, the adhesive includes a styrene-butadiene-styrene (SBS) copolymer. In some embodiments, the SBS copolymer is present in an amount of 0.5 wt. % to 30 wt. % based on a total weight of the adhesive. In some embodiments, the adhesive includes a process oil. In some embodiments, the process oil is present in an amount of 20 wt. % to 70 wt. % based on a total weight of the adhesive. In some embodiments, the asphalt is present in an amount of less than 1 wt. % based on the total weight of the adhesive. In some embodiments, a ratio of the SBS copolymer to the process oil in the adhesive is 1:10 to 1:3.

In some embodiments, the first substrate and the second substrate are the same. In some embodiments, the first substrate and the second substrate are different. In some embodiments, the first substrate, the second substrate, or any combination thereof is a roofing shingle.

In some embodiments, the at least one process oil is chosen from at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), or any combination thereof.

In some embodiments, the at least one process oil is at least one tall oil.

In some embodiments, the at least one tall oil takes the form of tall oil pitch.

In some embodiments, the at least one tackifier is at least one rosin ester.

In some embodiments, the at least one rosin ester is at least one pentaerythritol rosin ester.

In some embodiments, the at least one rosin ester is at least one glycerol rosin ester.

In some embodiments, the adhesive formulation includes at least one second polymer, wherein the second polymer is a styrene-ethylene-butylene-styrene (SEBS) copolymer.

In some embodiments, the first substrate is a TPO substrate.

In some embodiments, the second substrate is an ETFE substrate.

In some embodiments, a method includes obtaining a styrene-butadiene-styrene (SBS) copolymer. In some embodiments, the method includes obtaining asphalt. In some embodiments, the method includes mixing the SBS copolymer with the asphalt to form an adhesive formulation. In some embodiments, the SBS copolymer is present in an amount of 0.5 wt. % to 30 wt. % based on a total weight of the adhesive formulation. In some embodiments, the asphalt is present in an amount of 70 wt. % to 99.5 wt. % based on a total weight of the adhesive formulation. In some embodiments, a ratio of the SBS copolymer to the asphalt in the adhesive formulation is 1:11 to 1:3.

In some embodiments, the method includes adding a filler.

In some embodiments, the filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, the filler is present in an amount of 0.00001% to 70% by weight of the adhesive formulation.

In some embodiments, a method includes obtaining a styrene-butadiene-styrene (SBS) copolymer. In some embodiments, the method includes obtaining a process oil. In some embodiments, the method includes mixing the SBS copolymer with the process oil to form an adhesive formulation. In some embodiments, the SBS copolymer is present in an amount of 0.5 wt. % to 30 wt. % based on a total weight of the adhesive formulation. In some embodiments, the process oil is present in an amount of 20 wt. % to 70 wt. % based on a total weight of the adhesive formulation. In some embodiments, asphalt is present in an amount of less than 1 wt. % based on a total weight of the adhesive formulation. In some embodiments, a ratio of the SBS copolymer to the process oil in the adhesive formulation is 1:10 to 1:3.

In some embodiments, the method includes adding a filler.

In some embodiments, the filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, the filler is present in an amount of 0.00001% to 70% by weight of the adhesive formulation.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Figure 1:
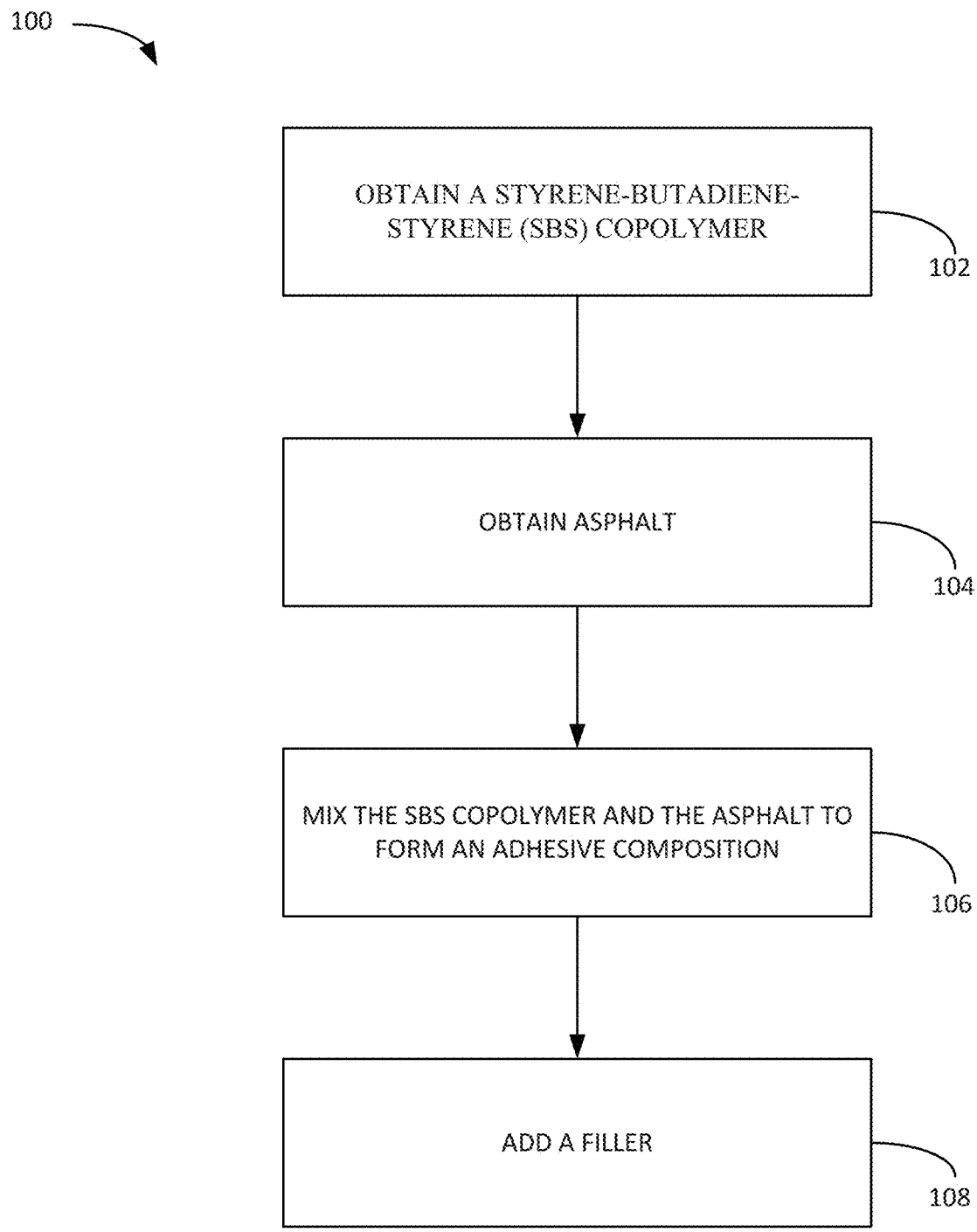
FIG. 1 shows a flowchart for a method of forming an adhesive formulation, according to some embodiments.

In some embodiments, an adhesive formulation comprises a styrenic block copolymer. In some embodiments, the styrenic block copolymer is chosen from or is selected from the group consisting of at least one of a styrene-butadiene-styrene (SBS) copolymer, at least one styrene-isoprene-styrene copolymer (SIS), at least one styrene-ethylene-butylene-styrene (SEBS) copolymer, or any combination thereof.

In some embodiments, the styrenic block copolymer is present in an amount of 0.5 wt. % to 30 wt. % based on a total weight of the adhesive formulation. In some embodiments, the styrenic block copolymer is present in an amount of 0.5 wt. % to 25 wt. % based on the total weight of the adhesive formulation. In some embodiments, the styrenic block copolymer is present in an amount of 0.5 wt. % to 20 wt. % based on the total weight of the adhesive formulation. In some embodiments, the styrenic block copolymer is present in an amount of 0.5 wt. % to 15 wt. % based on the total weight of the adhesive formulation. In some embodiments, the styrenic block copolymer is present in an amount of 0.5 wt. % to 10 wt. % based on the total weight of the adhesive formulation. In some embodiments, the styrenic block copolymer is present in an amount of 0.5 wt. % to 5 wt. % based on the total weight of the adhesive formulation. In some embodiments, the styrenic block copolymer is present in an amount of 0.5 wt. % to 1 wt. % based on the total weight of the adhesive formulation. In some embodiments, the styrenic block copolymer is present in an amount of 1 wt. % to 30 wt. % based on the total weight of the adhesive formulation. In some embodiments, the styrenic block copolymer is present in an amount of 5 wt. % to 30 wt. % based on the total weight of the adhesive formulation. In some embodiments, the styrenic block copolymer is present in an amount of 10 wt. % to 30 wt. % based on the total weight of the adhesive formulation. In some embodiments, the styrenic block copolymer is present in an amount of 15 wt. % to 30 wt. % based on the total weight of the adhesive formulation. In some embodiments, the styrenic block copolymer is present in an amount of 20 wt. % to 30 wt. % based on the total weight of the adhesive formulation. In some embodiments, the styrenic block copolymer is present in an amount of 25 wt. % to 30 wt. % based on the total weight of the adhesive formulation.

In some embodiments, the adhesive formulation comprises asphalt.

In some embodiments, the asphalt is present in an amount of 70 wt. % to 99.5 wt. % based on a total weight of the adhesive formulation. In some embodiments, the asphalt is present in an amount of 70 wt. % to 99 wt. % based on the total weight of the adhesive formulation. In some embodiments, the asphalt is present in an amount of 70 wt. % to 95 wt. % based on the total weight of the adhesive formulation. In some embodiments, the asphalt is present in an amount of 70 wt. % to 90 wt. % based on the total weight of the adhesive formulation. In some embodiments, the asphalt is present in an amount of 70 wt. % to 85 wt. % based on the total weight of the adhesive formulation. In some embodiments, the asphalt is present in an amount of 70 wt. % to 80 wt. % based on the total weight of the adhesive formulation. In some embodiments, the asphalt is present in an amount of 70 wt. % to 75 wt. % based on the total weight of the adhesive formulation. In some embodiments, the asphalt is present in an amount of 75 wt. % to 99.5 wt. % based on the total weight of the adhesive formulation. In some embodiments, the asphalt is present in an amount of 80 wt. % to 99.5 wt. % based on the total weight of the adhesive formulation. In some embodiments, the asphalt is present in an amount of 85 wt. % to 99.5 wt. % based on the total weight of the adhesive formulation. In some embodiments, the asphalt is present in an amount of 90 wt. % to 99.5 wt. % based on the total weight of the adhesive formulation. In some embodiments, the asphalt is present in an amount of 95 wt. % to 99.5 wt. % based on the total weight of the adhesive formulation. In some embodiments, the asphalt is present in an amount of 99 wt. % to 99.5 wt. % based on the total weight of the adhesive formulation.

In some embodiments, the adhesive formulation comprises at least one process oil.

In some embodiments, the at least one process oil is chosen from or is selected from the group consisting of: at least one paraffinic oil, at least one bio-oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), at least one tall oil, or any combination thereof.

In some embodiments, the at least one bio-oil is chosen from or is selected from the group consisting of: oils isolated from plants, oils isolated from animals, oils isolated from microorganisms, or any combination thereof.

In some embodiments, the at least one process oil is chosen from or is selected from the group consisting of at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), or any combination thereof.

In some embodiments, the at least one process oil, comprises, consists essentially of, or consists of at least one tall oil. In some embodiments, the at least one tall oil comprises consists essentially of, or consists of tall oil pitch.

In some embodiments, the at least one process oil comprises saturates, aromatics, resins, asphaltenes, or any combination thereof.

In some embodiments, the at least one process oil is present in an amount of 20 wt. % to 70 wt. % based on a total weight of the adhesive formulation. In some embodiments, the at least one process oil is present in an amount of 20 wt. % to 60 wt. % based on the total weight of the adhesive formulation. In some embodiments, the at least one process oil is present in an amount of 20 wt. % to 50 wt. % based on the total weight of the adhesive formulation. In some embodiments, the at least one process oil is present in an amount of 20 wt. % to 40 wt. % based on the total weight of the adhesive formulation. In some embodiments, the at least one process oil is present in an amount of 20 wt. % to 30 wt. % based on the total weight of the adhesive formulation. In some embodiments, the at least one process oil is present in an amount of 30 wt. % to 70 wt. % based on the total weight of the adhesive formulation. In some embodiments, the at least one process oil is present in an amount of 40 wt. % to 70 wt. % based on the total weight of the adhesive formulation. In some embodiments, the at least one process oil is present in an amount of 50 wt. % to 70 wt. % based on the total weight of the adhesive formulation. In some embodiments, the at least one process oil is present in an amount of 60 wt. % to 70 wt. % based on the total weight of the adhesive formulation.

In some embodiments, the adhesive formulation comprises at least one plasticizer. In some embodiments, the at least one plasticizer comprises at least one of polyethylene glycol, polypropylene glycol, polyether diol, iso-decyl benzoate, triethylene glycol bis (2-ethylhexanoate), ethoxylated castor oil, oleic acid ethoxylate, alkylphenol ethoxylates, copolymers of ethylene oxide (EO) and propylene oxide (PO), silicone polyether copolymers, terephthalates, polyethylene terephthalates (PET), or any combination thereof.

In some embodiments, a mixture including the at least one plasticizer and the at least one process oil is present in an amount of 20 wt. % to 70 wt. % based on a total weight of the adhesive formulation. In some embodiments, the mixture including the at least one plasticizer and the at least one process oil is present in an amount of 20 wt. % to 60 wt. % based on the total weight of the adhesive formulation. In some embodiments, the mixture including the at least one plasticizer and the at least one process oil is present in an amount of 20 wt. % to 50 wt. % based on the total weight of the adhesive formulation. In some embodiments, the mixture including the at least one plasticizer and the at least one process oil is present in an amount of 20 wt. % to 40 wt. % based on the total weight of the adhesive formulation. In some embodiments, the mixture including the at least one plasticizer and the at least one process oil is present in an amount of 20 wt. % to 30 wt. % based on the total weight of the adhesive formulation. In some embodiments, the mixture including the at least one plasticizer and the at least one process oil is present in an amount of 30 wt. % to 70 wt. % based on the total weight of the adhesive formulation. In some embodiments, the plasticizer and the at least one process oil are present in a combined amount of 40 wt. % to 70 wt. % based on the total weight of the adhesive formulation. In some embodiments, the plasticizer and the at least one process oil are present in a combined amount of 50 wt. % to 70 wt. % based on the total weight of the adhesive formulation. In some embodiments, the plasticizer and the at least one process oil are present in a combined amount of 60 wt. % to 70 wt. % based on the total weight of the adhesive formulation.

In some embodiments, the at least one plasticizer is combined with the at least one process oil to form a mixture, the at least one plasticizer is present in the mixture in an amount not exceeding 50 wt. % based on a total weight of the mixture. In some embodiments, the at least one plasticizer is present in the mixture in an amount not exceeding 45 wt. % based on the total weight of the mixture. In some embodiments, the at least one plasticizer is present in the mixture in an amount not exceeding 40 wt. % based on the total weight of the mixture. In some embodiments, the at least one plasticizer is present in the mixture in an amount not exceeding 35 wt. % based on the total weight of the mixture. In some embodiments, the at least one plasticizer is present in the mixture in an amount not exceeding 30 wt. % based on the total weight of the mixture. In some embodiments, the at least one plasticizer is present in the mixture in an amount not exceeding 25 wt. % based on the total weight of the mixture. In some embodiments, the at least one plasticizer is present in the mixture in an amount not exceeding 20 wt. % based on the total weight of the mixture. In some embodiments, the at least one plasticizer is present in the mixture in an amount not exceeding 15 wt. % based on the total weight of the mixture. In some embodiments, the at least one plasticizer is present in the mixture in an amount not exceeding 10 wt. % based on the total weight of the mixture. In some embodiments, the at least one plasticizer is present in the mixture in an amount not exceeding 5 wt. % based on the total weight of the mixture. In some embodiments, the at least one plasticizer is present in the mixture in an amount not exceeding 1 wt. % based on the total weight of the mixture.

In some embodiments, the adhesive formulation includes less than 1 wt. % asphalt based on a total weight of the adhesive formulation. In some embodiments, the adhesive formulation includes less than 0.75 wt. % asphalt based on the total weight of the adhesive formulation. In some embodiments, the adhesive formulation includes less than 0.5 wt. % asphalt based on the total weight of the adhesive formulation. In some embodiments, the adhesive formulation includes less than 0.25 wt. % asphalt based on the total weight of the adhesive formulation.

In some embodiments, the adhesive formulation comprises at least one fire retardant.

In some embodiments, the at least one fire retardant comprises colemanite, aluminum trihydrate, magnesium hydroxide, expandable graphite, ammonium polyphosphate, triphenyl phosphate, resorcinol bis(diphenylphosphate), bisphenol A diphenyl phosphate, tricresyl phosphate, dimethyl methylphosphonate, aluminium diethyl phosphinate, decabromodiphenyl ether, decabromodiphenyl ethane, at least one brominated polystyrene, at least one brominated carbonate oligomer, at least one brominated epoxy oligomer, tetrabromophthalic anhydride, tetrabromobisphenol A, hexabromocyclododecane, antimony trioxide, antimony pentoxide, at least one chlorinated paraffin, huntite, hydromagnesite, red phosphorous, zinc borate, sodium borate, lithium borate, boric acid, tris(1,3-dichloro-2-propyl)phosphate, (tetrakis(2-chlorethyl)dichloroisopentyldiphosphate, or any combination thereof.

In some embodiments, the adhesive formulation further comprises at least one filler.

In some embodiments, the at least one filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

Some embodiments of the present disclosure relate to a method of using an adhesive formulation that is free or substantially free of asphalt.

In some embodiments, the method comprises applying the adhesive formulation to at least one surface of a substrate. In some embodiments, the substrate is a roof substrate. In some embodiments, the substrate or roof substrate is a plywood substrate, a glass substrate, a fiberglass substrate, (e.g., a fiberglass mat), a cellulosic substrate, a shingle (e.g., a roofing shingle), an underlayment, a roofing membrane (e.g., a thermoplastic polyolefin (TPO) or polyvinyl chloride (PVC) membrane), a roof deck, a photovoltaic (PV) panel, a modified bitumen (MODBIT) substrate, an ethylene tetrafluoroethylene (ETFE) substrate, a roll good, or any combination thereof.

In some embodiments, the method further comprises forming the adhesive formulation into at least one adhesive sheet, forming the adhesive into at least one adhesive strip, or any combination thereof. In some embodiments, the forming of the adhesive formulation into at least one adhesive sheet, the forming the adhesive into at least one adhesive strip, or any combination thereof comprises casting the adhesive formulation into the at least one adhesive sheet, casting the adhesive formulation into the at least one adhesive strip, or any combination thereof. In some embodiments, the casting is performed with a roller mill.

In some embodiments, the roofing membrane is a low surface energy roofing membrane. In some embodiments, the low surface energy roofing membrane has a surface energy of 40 mN/m or less. In some embodiments, a low surface energy roofing membrane has a surface energy of 35 mN/m or less. In some embodiments, a low surface energy roofing membrane has a surface energy of 30 mN/m or less. In some embodiments, a low surface energy roofing membrane has a surface energy of 25 mN/m or less. In some embodiments, a low surface energy roofing membrane has a surface energy of 20 mN/m or less. In some embodiments, a low surface energy roofing membrane has a surface energy of 15 mN/m or less. In some embodiments, a low surface energy roofing membrane has a surface energy of 10 mN/m or less.

In some embodiments, the roofing membrane includes at least one of thermoplastic polyolefins, polyvinyl chlorides, cyclopiazonic acid, chlorinated polyethylene resins, ethylene interpolymers, nitrile butadiene polymers, polyisobutylene, atactic-polypropylene, APP-modified bitumen, poly (styrene-butadiene-styrene), styrene ethylene butylene styrene, ethylene propylene diene monomers, chlorosulfonated polyethylene rubbers, polychloroprene, extracellular region membranes, polycarbonate, nylon, polyvinyl acetate, polystyrene, polytetrafluoroethylene, polyvinylidene fluoride, polyurethane, epoxy, or combinations thereof.

In some embodiments, the roofing substrate includes at least one of silicone, plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic, or combinations thereof.

In some embodiments, the roofing membrane includes a thermoplastic polyolefin, and the roofing substrate includes a thermoplastic polyolefin.

In some embodiments, the roofing membrane includes a thermoplastic polyolefin, and the roofing substrate includes a polyisocyanurate.

In addition, conventional membrane materials, such as those made from thermoplastic polyolefins (TPO) or polyvinyl chloride (PVC) for example, often require an adhesion-assisting layer coupled to the membrane material in order to achieve proper adhesion to the roof substrate. Such adhesion-assisting layers includes a fleece material (e.g., "fleece-backed membranes") a texturing layer, a solvent-treated layer, or the like. Adding adhesion-assisting layers can lead to time-consuming manufacturing, a more costly membrane product, and can add to both the weight and bulkiness of roofing systems. Conventional membrane materials can also be treated, e.g., chemically, to provide texture and/or provide a slight increase in surface energy such that the membrane will adhere to the roof substrate, however, these surface treatments often increase overall hazardous chemical use during manufacturing of the membrane and often lead to weaker and less uniform adhesion than membranes including adhesion assigning layers.

Other conventional membrane materials are mechanically fastened to the roof substrate using screws or other fasteners at discrete points across the surface of the membrane material. The process of mechanically fastening the membrane material to the roof substrate can be relatively faster than adhesive-only membrane materials, however, mechanically fastened membrane materials often degrade, tear, wear, erode, thin, separate, delaminate, or otherwise fail at one or more of the discrete fastening points during long-term use.

In other words, conventional mechanical fastening approaches are often faster and cheaper to install when compared to adhesive-only approaches but tend to fail earlier than adhesive-only approaches. Adhesive-only approaches typically result in longer-lasting protection for the roof, but are more costly and time-consuming to install, and result in heavier and bulkier membranes. In addition, conventional solvent surface treatments typically produce more toxic chemical waste than the mechanical fastening approach. Therefore, there is a need in the market for an adhesive-only roofing membrane that is superior to mechanically fastened membranes, easier and quicker to install than conventional adhesive-only membrane materials, and that does not require an adhesion-assisting layer.

In some embodiments, the adhesive formulation includes at least one second polymer chosen from: at least one polyolefin, oxidized polyethylene (OPE), polyethylene-polypropylene elastomer, ground tire rubber (GTR), isotactic polypropylene (IPP), atactic polypropylene (APP), or any combination thereof.

In some embodiments, the at least one second polymer is present in an amount of 0.1 wt. % to 20 wt. % based on a total weight of the adhesive formulation. In some embodiments, the at least one second polymer is present in an amount of 0.1 wt. % to 15 wt. % based on the total weight of the adhesive formulation. In some embodiments, the at least one second polymer is present in an amount of 0.1 wt. % to 10 wt. % based on the total weight of the adhesive formulation. In some embodiments, the at least one second polymer is present in an amount of 0.1 wt. % to 5 wt. % based on the total weight of the adhesive formulation. In some embodiments, the at least one second polymer is present in an amount of 0.1 wt. % to 1 wt. % based on the total weight of the adhesive formulation. In some embodiments, the at least one second polymer is present in an amount of 1 wt. % to 20 wt. % based on the total weight of the adhesive formulation. In some embodiments, the at least one second polymer is present in an amount of 5 wt. % to 20 wt. % based on the total weight of the adhesive formulation. In some embodiments, the at least one second polymer is present in an amount of 10 wt. % to 20 wt. % based on the total weight of the adhesive formulation. In some embodiments, the at least one second polymer is present in an amount of 15 wt. % to 20 wt. % based on the total weight of the adhesive formulation.

In some embodiments, the adhesive formulation further includes at least one filler in an amount of 10 wt. % to 70 wt. % based on a total weight of the adhesive formulation. In some embodiments, the at least one filler is present in amount of 10 wt. % to 65 wt. % based on the total weight of the adhesive formulation. In some embodiments, the at least one filler is present in amount of 10 wt. % to 60 wt. % based on the total weight of the adhesive formulation. In some embodiments, the at least one filler is present in amount of 10 wt. % to 55 wt. % based on the total weight of the adhesive formulation. In some embodiments, the at least one filler is present in amount of 10 wt. % to 50 wt. % based on the total weight of the adhesive formulation. In some embodiments, the at least one filler is present in amount of 10 wt. % to 45 wt. % based on the total weight of the adhesive formulation. In some embodiments, the at least one filler is present in amount of 10 wt. % to 40 wt. % based on the total weight of the adhesive formulation. In some embodiments, the at least one filler is present in amount of 10 wt. % to 35 wt. % based on the total weight of the adhesive formulation. In some embodiments, the at least one filler is present in amount of 10 wt. % to 30 wt. % based on the total weight of the adhesive formulation. In some embodiments, the at least one filler is present in amount of 10 wt. % to 25 wt. % based on the total weight of the adhesive formulation. In some embodiments, the at least one filler is present in amount of 10 wt. % to 20 wt. % based on the total weight of the adhesive formulation. In some embodiments, the at least one filler is present in amount of 10 wt. % to 15 wt. % based on the total weight of the adhesive formulation.

In some embodiments, the at least one filler is present in amount of 15 wt. % to 70 wt. % based on the total weight of the adhesive formulation. In some embodiments, the at least one filler is present in amount of 20 wt. % to 70 wt. % based on the total weight of the adhesive formulation. In some embodiments, the at least one filler is present in amount of 25 wt. % to 70 wt. % based on the total weight of the adhesive formulation. In some embodiments, the at least one filler is present in amount of 30 wt. % to 70 wt. % based on the total weight of the adhesive formulation. In some embodiments, the at least one filler is present in amount of 35 wt. % to 70 wt. % based on the total weight of the adhesive formulation. In some embodiments, the at least one filler is present in amount of 40 wt. % to 70 wt. % based on the total weight of the adhesive formulation. In some embodiments, the at least one filler is present in amount of 45 wt. % to 70 wt. % based on the total weight of the adhesive formulation. In some embodiments, the at least one filler is present in amount of 50 wt. % to 70 wt. % based on the total weight of the adhesive formulation. In some embodiments, the at least one filler is present in amount of 55 wt. % to 70 wt. % based on the total weight of the adhesive formulation. In some embodiments, the at least one filler is present in amount of 60 wt. % to 70 wt. % based on the total weight of the adhesive formulation. In some embodiments, the at least one filler is present in amount of 65 wt. % to 70 wt. % based on the total weight of the adhesive formulation.

In some embodiments, the at least one filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, the adhesive formulation includes at least one additive in an amount of 0.00001 wt. % to 70 wt. % based on a total weight of the adhesive formulation. In some embodiments, the adhesive formulation includes at least one additive in an amount of 0.0001 wt. % to 70 wt. % based on the total weight of the adhesive formulation. In some embodiments, the adhesive formulation includes at least one additive in an amount of 0.001 wt. % to 70 wt. % based on the total weight of the adhesive formulation. In some embodiments, the adhesive formulation includes at least one additive in an amount of 0.01 wt. % to 70 wt. % based on the total weight of the adhesive formulation. In some embodiments, the adhesive formulation includes at least one additive in an amount of 0.1 wt. % to 70 wt. % based on the total weight of the adhesive formulation. In some embodiments, the adhesive formulation includes at least one additive in an amount of 1 wt. % to 70 wt. % based on the total weight of the adhesive formulation. In some embodiments, the adhesive formulation includes at least one additive in an amount of 5 wt. % to 70 wt. % based on the total weight of the adhesive formulation. In some embodiments, the adhesive formulation includes at least one additive in an amount of 10 wt. % to 70 wt. % based on the total weight of the adhesive formulation. In some embodiments, the adhesive formulation includes at least one additive in an amount of 15 wt. % to 70 wt. % based on the total weight of the adhesive formulation. In some embodiments, the adhesive formulation includes at least one additive in an amount of 20 wt. % to 70 wt. % based on the total weight of the adhesive formulation. In some embodiments, the adhesive formulation includes at least one additive in an amount of 25 wt. % to 70 wt. % based on the total weight of the adhesive formulation. In some embodiments, the adhesive formulation includes at least one additive in an amount of 30 wt. % to 70 wt. % based on the total weight of the adhesive formulation. In some embodiments, the adhesive formulation includes at least one additive in an amount of 35 wt. % to 70 wt. % based on the total weight of the adhesive formulation. In some embodiments, the adhesive formulation includes at least one additive in an amount of 40 wt. % to 70 wt. % based on the total weight of the adhesive formulation. In some embodiments, the adhesive formulation includes at least one additive in an amount of 45 wt. % to 70 wt. % based on the total weight of the adhesive formulation. In some embodiments, the adhesive formulation includes at least one additive in an amount of 50 wt. % to 70 wt. % based on the total weight of the adhesive formulation. In some embodiments, the adhesive formulation includes at least one additive in an amount of 55 wt. % to 70 wt. % based on the total weight of the adhesive formulation. In some embodiments, the adhesive formulation includes at least one additive in an amount of 60 wt. % to 70 wt. % based on the total weight of the adhesive formulation. In some embodiments, the adhesive formulation includes at least one additive in an amount of 65 wt. % to 70 wt. % based on the total weight of the adhesive formulation.

In some embodiments, the adhesive formulation includes at least one additive in an amount of 0.0001 wt. % to 65 wt. % based on the total weight of the adhesive formulation. In some embodiments, the adhesive formulation includes at least one additive in an amount of 0.0001 wt. % to 60 wt. % based on the total weight of the adhesive formulation. In some embodiments, the adhesive formulation includes at least one additive in an amount of 0.0001 wt. % to 55 wt. % based on the total weight of the adhesive formulation. In some embodiments, the adhesive formulation includes at least one additive in an amount of 0.0001 wt. % to 50 wt. % based on the total weight of the adhesive formulation. In some embodiments, the adhesive formulation includes at least one additive in an amount of 0.0001 wt. % to 45 wt. % based on the total weight of the adhesive formulation. In some embodiments, the adhesive formulation includes at least one additive in an amount of 0.0001 wt. % to 40 wt. % based on the total weight of the adhesive formulation. In some embodiments, the adhesive formulation includes at least one additive in an amount of 0.0001 wt. % to 35 wt. % based on the total weight of the adhesive formulation. In some embodiments, the adhesive formulation includes at least one additive in an amount of 0.0001 wt. % to 30 wt. % based on the total weight of the adhesive formulation. In some embodiments, the adhesive formulation includes at least one additive in an amount of 0.0001 wt. % to 25 wt. % based on the total weight of the adhesive formulation. In some embodiments, the adhesive formulation includes at least one additive in an amount of 0.0001 wt. % to 20 wt. % based on the total weight of the adhesive formulation. In some embodiments, the adhesive formulation includes at least one additive in an amount of 0.0001 wt. % to 15 wt. % based on the total weight of the adhesive formulation. In some embodiments, the adhesive formulation includes at least one additive in an amount of 0.0001 wt. % to 10 wt. % based on the total weight of the adhesive formulation. In some embodiments, the adhesive formulation includes at least one additive in an amount of 0.0001 wt. % to 5 wt. % based on the total weight of the adhesive formulation. In some embodiments, the adhesive formulation includes at least one additive in an amount of 0.0001 wt. % to 1 wt. % based on the total weight of the adhesive formulation. In some embodiments, the adhesive formulation includes at least one additive in an amount of 0.0001 wt. % to 0.1 wt. % based on the total weight of the adhesive formulation. In some embodiments, the adhesive formulation includes at least one additive in an amount of 0.0001 wt. % to 0.01 wt. % based on the total weight of the adhesive formulation. In some embodiments, the adhesive formulation includes at least one additive in an amount of 0.0001 wt. % to 0.001 wt. % based on the total weight of the adhesive formulation.

In some embodiments, the at least one additive is at least one wax, at least one antioxidant, ethylene-bis-stearamide (EBS), or any combination thereof.

In some embodiments, the substrate is a plywood substrate, a glass substrate, a cellulosic substrate, a roofing shingle, an underlayment, a roofing membrane, a roof deck, a photovoltaic (PV) panel, a modified bitumen (MODBIT) substrate, a roll good, or any combination thereof.

In some embodiments, the adhesive formulation is formed into at least one adhesive sheet, at least one adhesive strip, or any combination thereof.

In some embodiments, forming of the adhesive formulation into at least one adhesive sheet, the forming the adhesive into at least one adhesive strip, or any combination thereof includes casting the adhesive formulation into the at least one adhesive sheet, casting the adhesive formulation into the at least one adhesive strip, or any combination thereof.

FIG. 1 shows a flowchart for a method 100 of forming an adhesive formulation, according to some embodiments.

In some embodiments, the method 100 includes obtaining a stryenic block copolymer at block 102. In some embodiments, the styrenic block copolymer includes at least one of a styrene-butadiene-styrene (SBS) copolymer, a styrene-isoprene-styrene copolymer (SIS), a styrene-ethylene-butylene-styrene (SEBS) copolymer, suitable combinations thereof, or the like.

In some embodiments, the method 100 includes obtaining asphalt at block 104.

In some embodiments, the method 100 includes mixing the styrenic block copolymer with the asphalt to form an adhesive formulation at block 106.

In some embodiments, the styrenic block copolymer is present in an amount of 0.5 wt. % to 30 wt. % based on a total weight of the adhesive formulation.

In some embodiments, the asphalt is present in an amount of 70 wt. % to 99.5 wt. % based on a total weight of the adhesive formulation. In some embodiments, a ratio of the SBS copolymer to the asphalt in the adhesive formulation is 1:11 to 1:3.

In some embodiments, the method 100 includes adding a filler at block 108.

In some embodiments, the filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, the filler is present in an amount of 0.00001% to 70% by weight of the adhesive formulation.

Figure 2:
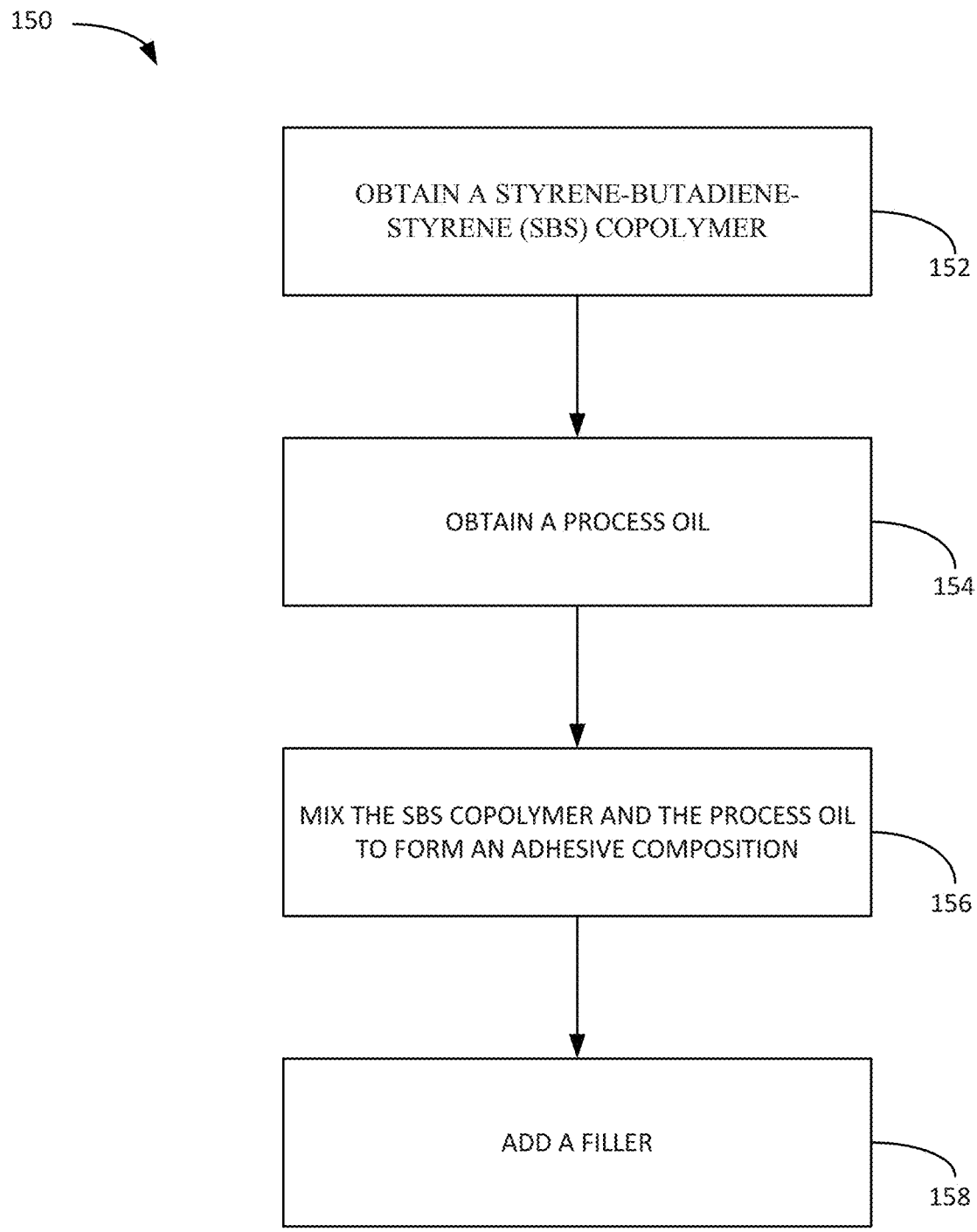
FIG. 2 shows a flowchart for a method of forming an adhesive formulation, according to some embodiments.

FIG. 2 shows a flowchart for a method 150 of forming an adhesive formulation, according to some embodiments.

In some embodiments, the method 150 includes obtaining a styrenic block copolymer at block 152.

In some embodiments, the method 150 includes obtaining a process oil at block 154.

In some embodiments, the method 150 includes mixing the styrenic block copolymer with the process oil to form an adhesive formulation at block 156.

In some embodiments, the styrenic block copolymer is present in an amount of 0.5 wt. % to 30 wt. % based on a total weight of the adhesive formulation.

In some embodiments, the process oil is present in an amount of 20 wt. % to 70 wt. % based on a total weight of the adhesive formulation.

In some embodiments, asphalt is present in an amount of less than 1 wt. % based on a total weight of the adhesive formulation. In some embodiments, a ratio of the styrenic block copolymer to the process oil in the adhesive formulation is 1:10 to 1:3.

In some embodiments, the method 150 includes adding a filler at block 158.

In some embodiments, the filler is calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, expandable graphite, or any combination thereof.

In some embodiments, the filler is present in an amount of 0.00001% to 70% by weight of the adhesive formulation.

Example formulations of three example adhesives A, B, and C are shown in Table 1 below.

TABLE 1

| Formulations | Units | A | B | C |
|---|---|---|---|---|
| Hydrocarbon oil | wt. % | 50 | 50 | 50 |
| SBS | wt. % | 10 | 10 | 10 |
| TiO$_2$ | wt. % | | 10 | |
| Filler | wt. % | | 30 | |
| Limestone Filler | wt. % | 40 | | |
| Recycled Asphalt | wt. % | | | 40 |
| Total Weight Percentage | wt. % | 100 | 100 | 100 |

Properties of the three adhesives A, B, and C are shown in Table 2 below.

TABLE 2

| ASTM D1970 Compound Properties | | A | B | C |
|---|---|---|---|---|
| Viscosity @ 374 F. (LVT) | cP | 4600 | 5100 | 6000 |
| Penetration @ 73 F. | dmm | 96 | 83 | 73 |
| Penetration @ 140 F. | dmm | 99 | 112 | 82 |
| Softening Point (Ring and Ball) | F | 200 | 199 | 211 |

Figure 3:
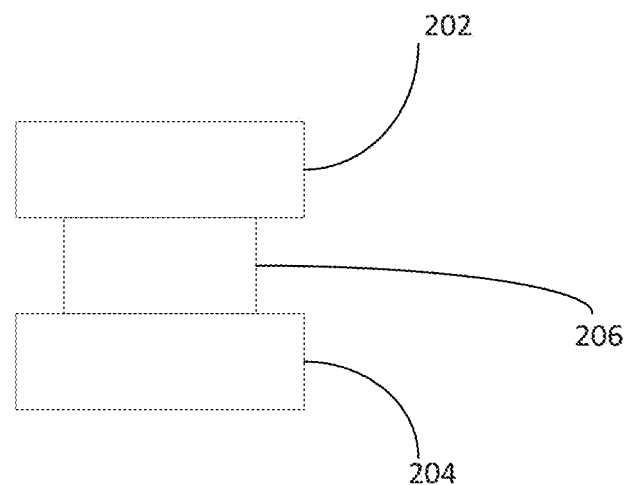
FIG. 3 shows an example system using an adhesive formulation, according to some embodiments.

Table 3 shows peel strengths in a 180° peel test at two different temperatures for a TPO to TPO bonded using adhesives A, B, and C. Samples were adhered using Formulations A, B, and C and the peel strength is at 180°. The results are shown in Table 3. The adhesives were applied between a first TPO substrate and a second TPO substrate to form the samples. The peel strength at 180° was obtained by lifting the second TPO substrate at 180° from the first TPO substrate. An example of the samples is shown in FIG. 3. As shown in side view, a first substrate 202 (here a TPO substrate) is fixed to a second substrate 204 (here a TPO substrate). Adhesive 206 is applied between the first substrate 202 and the second substrate 204.

TABLE 3

| | | A | B | C |
|---|---|---|---|---|
| Tested @ 40 F. | lb./ft. | 50 | 52 | 64 |
| Tested @ 73 F. | lb./ft. | 9 | 10 | 18 |

Table 4 shows peel strengths in a 180° peel test at two different temperatures for a TPO to ISO bonded using various adhesives. The results are shown in Table 4. The adhesives were applied between a TPO substrate and an ISO substrate to form the samples. The peel strength at 180° was obtained by lifting the ISO substrate at 180° from the TPO substrate. The adhesive was applied in a 2 inch strip and a 1 inch strip on 3 inch samples of the TPO substrate and the ISO substrate. Failure modes are also displayed in Table 4.

TABLE 4

| 91% asphalt + 9% Kraton 1191 Adhesive | 2" strip | 1" strip |
|---|---|---|
| Max load (lbf) | 14 | 8 |
| Mode of failure | facer | facer |
| 77% Asphalt + 8% 1191 + 15% limestone | 2" strip | 1" strip |
| Max load (lbf) | 11 | 8 |
| Mode of failure | facer | facer |
| 77% asphalt + 8% 1184 15% limestone | 2" strip | 1" strip |
| Max load (lbf) | 11 | 6 |
| Mode of failure | facer | facer |
| Adhesive-A | RT 2" strip | 40F 2" strip |
| Max load (lbf) | 10 | 7 |
| Mode of failure | facer | facer |
| Adhesive-B | RT 2" strip | 40F 2" strip |
| Max load (lbf) | 5 | 6 |
| Mode of failure | facer | facer |
| Adhesive-C | RT 2" strip | 40F 2" strip |
| Max load (lbf) | 5 | 8 |
| Mode of failure | facer | facer |

Table 5 shows peel strengths in a 180° peel test at two different temperatures for a TPO to PDVF. The results are shown in Table 5. The adhesive was applied between a TPO substrate and a PVDF substrate to form the sample. The peel strength at 180° was obtained by lifting the PVDF substrate at 180° from the TPO substrate. The adhesive was applied in a 2 inch strip and on a 3 inch sample of the TPO substrate and the PVDF substrate. Failure mode is also displayed in Table 5.

TABLE 5

| 91% Asphalt + 9% Kraton 1191 | 2" strip | Surface Free Energy of PVDF 33 mN/m |
|---|---|---|
| Max load (lbf) | 34 | Surface Free Energy of TPO back 24 mN/m |
| Mode of failure | PVDF to Adhesive | |

Table 6 shows peel strengths in a T-peel test various substrates with Adhesive A at a 27 mil thickness. The results are shown in Table 6. The T-peel strength was obtained by progressively lifting the substrates from each other.

TABLE 6

| Substrates | Adhesive | Top Layer | RT Peel LBF/FT | Mode of Failure |
|---|---|---|---|---|
| Plywood | Adhesive - A-27 mil | Polyolefin NW top + Polyolefin EVA back 34 mN/m* (adhesion between the plywood Polyolefin EVA Back | 23 | Adhesive to Substrate |

TABLE 6-continued

| Substrates | Adhesive | Top Layer | RT Peel LBF/FT | Mode of Failure |
|---|---|---|---|---|
| | | coat) | | |
| Plywood | Adhesive - A-27 mil | Polyolefin NW top laminated to Al-foil (adhesion between plywood and Al-foil) | 31 | Adhesive to Substrate |
| Plywood | Adhesive - A-27 mil | Film made out of Polypropylene and EVA blend 34 mN/m* | 20 | Adhesive to Substrate |
| Plywood | Adhesive - A-27 mil | Filled polyolefin composite 29 mN/m* | 7 | Adhesive to Substrate & Adhesive to Top Layer |
| Plywood | Adhesive - A-27 mil | Synthetic underlayment back Polypropylene 32 mN/m* | 18 | Adhesive to Substrate |
| Plywood | Adhesive - A-27 mil | Synthetic underlayment Propylene Elastomer 26.5 mN/m* | 8 | Adhesive to Substrate |
| Plywood | Adhesive - A-27 mil | PVC KEEE | 10 | Adhesive to Top Layer |
| Plywood | Adhesive - A-27 mil | Base sheet made out of SBS modified asphalt (ASTM D 6163 Type I-Ruberoid 20) | 22 | Adhesive to Substrate |
| Plywood | Adhesive - A-27 mil | Polyethylene (Back of ASTM D 6163 Heat Weld Cap sheet-Ruberoid HW) | 24 | Adhesive to Substrate |
| Plywood | Adhesive - A-27 mil | Oxidized asphalt with sand | 6 | Adhesive to Top Layer |

Table 7 shows peel strengths in a T-peel test various substrates with Adhesive A at a 33 mil thickness. The results are shown in Table 7. The T-peel strength was obtained by progressively lifting the substrates from each other.

TABLE 7

| Substrates | Adhesive | Top Layer | RT Peel LBF/FT | Mode of Failure |
|---|---|---|---|---|
| Polypropylene NW (Stormguard with blue top) | Adhesive - A-33 mil | Polyolefin EVA compound 34 mN/m* | 16 | Adhesive to Substrate |
| Polypropylene NW with Al-foil back | Adhesive - A-33 mil | Polypropylene NW with Al-foil back (Al-foil to Al-foil) | 10 | Adhesive to Substrate & Adhesive to Top Layer |
| TPO Treated BACK | Adhesive - A-33 mil | TPO Treated Back (Back to back) | 24 | Adhesive to Substrate & Adhesive to Top Layer |
| Polypropylene NW (Felt Buster top) | Adhesive - A-33 mil | Propylene Elastomer 26.5 mN/m* | 10 | Adhesive to Substrate |
| TPO Face 29 mN/m* | Adhesive - A-33 mil | TPO Back 24 mN/m* | 11 | Adhesive to Substrate |

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A roofing system comprising:
   a roofing membrane,
      wherein the roofing membrane has at least one untreated surface, wherein the at least one untreated surface has a surface energy of 40 mN/m or less;
   a roofing substrate,
      wherein the roofing substrate is selected from the group consisting of at least one of a plywood substrate, an underlayment, a roof deck, or any combination thereof; and
   an adhesive,
      wherein the adhesive is located between the roofing membrane and the roofing substrate,
      wherein the adhesive directly contacts the at least one untreated surface of the roofing membrane and the roofing substrate;
      wherein the adhesive adheres the roofing membrane to the roofing substrate;
      wherein the adhesive, when applied at a thickness of 27 mils to 33 mils and when located between the roofing membrane and the roofing substrate, exhibits a peel strength of at least 5 lbf./ft., as measured by lifting the roofing membrane from the roofing substrate at 180° and at 77° F.

2. The roofing system of claim 1, wherein the at least one untreated surface has a surface energy of 30 mN/m or less.

3. The roofing system of claim 1, wherein the at least one untreated surface has a surface energy of 20 mN/m or less.

4. The roofing system of claim 1, wherein the roofing substrate is the plywood substrate.

5. The roofing system of claim 1, wherein the roofing substrate is the underlayment.

6. The roofing system of claim 1, wherein the roofing substrate is the roof deck.

7. The roofing system of claim 1, wherein the adhesive is substantially free of asphalt.

8. The roofing system of claim 1, wherein the adhesive is free of asphalt.

9. The roofing system of claim 1, wherein the adhesive further comprises 1% by weight or less of an asphalt based on a total weight of the adhesive.

10. The roofing system of claim 1, wherein the adhesive, when applied at a thickness of 27 mils to 33 mils and when located between the roofing membrane and the roofing substrate, exhibits a peel strength of 5 lbf./ft. to 35 lbf./ft., as measured by lifting the roofing membrane from the roofing substrate at 180° and at 77° F.

11. A method comprising:
   obtaining an adhesive,
      wherein the adhesive comprises a styrenic block copolymer and a process oil;
   obtaining a roofing membrane,
      wherein the roofing membrane has at least one untreated surface,
      wherein the at least one untreated surface has a surface energy of 40 mN/m or less;
   applying the adhesive to a roofing substrate,
      wherein the roofing substrate is selected from the group consisting of at least one of a plywood substrate, an underlayment, a roof deck, or any combination thereof; and
   applying the roofing membrane to the adhesive, wherein the adhesive is located between the roofing membrane and the roofing substrate, wherein the adhesive directly contacts the at least one untreated surface of the roofing membrane and the roofing substrate;

wherein the adhesive adheres the roofing membrane to the roofing substrate;

wherein the adhesive, when applied at a thickness of 27 mils to 33 mils and when located between the roofing membrane and the roofing substrate, exhibits a peel strength of at least 5 lbf./ft., as measured by lifting the roofing membrane from the roofing substrate at 180° and at 77° F.

12. The method of claim 11, wherein the at least one untreated surface has a surface energy of 30 mN/m or less.

13. The method of claim 11, wherein the at least one untreated surface has a surface energy of 20 mN/m or less.

14. The method of claim 11, wherein the roofing substrate is the plywood substrate.

15. The method of claim 11, wherein the roofing substrate is the underlayment.

16. The method of claim 11, wherein the roofing substrate is the roof deck.

17. The method of claim 11, wherein the adhesive is substantially free of asphalt.

18. The method of claim 11, wherein the adhesive is free of asphalt.

19. The method of claim 11, wherein the adhesive further comprises 1% by weight or less of an asphalt based on a total weight of the adhesive.

20. The method of claim 11, wherein the adhesive, when applied at a thickness of 27 mils to 33 mils and when located between the roofing membrane and the roofing substrate, exhibits a peel strength of 5 lbf./ft. to 35 lbf./ft., as measured by lifting the roofing membrane from the roofing substrate at 180° and at 77° F.

* * * * *